Aug. 14, 1934.  H. S. COLBY ET AL  1,970,534
METHOD OF HEAT EXCHANGE
Original Filed Jan. 2, 1930    2 Sheets-Sheet 1

INVENTORS
Haldwell S. Colby
BY Per Hilmer Karlson
Nathaniel Frucht
ATTORNEY

Aug. 14, 1934.  H. S. COLBY ET AL  1,970,534
METHOD OF HEAT EXCHANGE
Original Filed Jan. 2, 1930   2 Sheets-Sheet 2
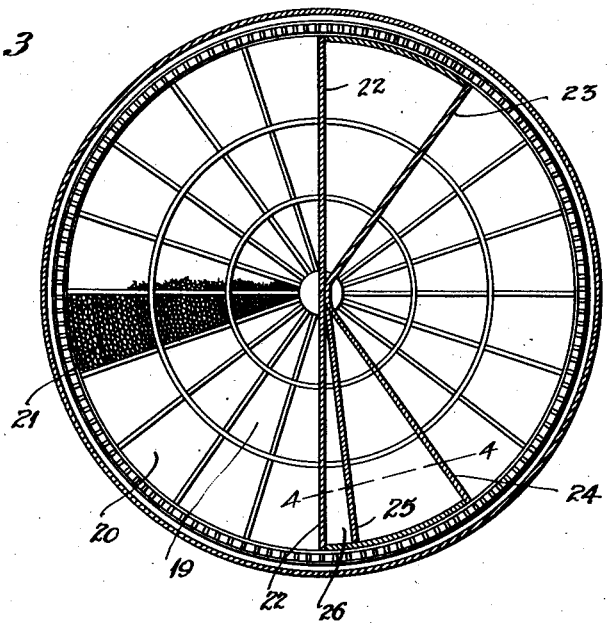
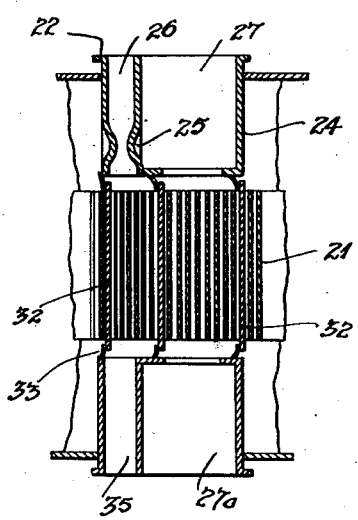
INVENTORS
Haldwell S. Colby
BY Per Hilmer Karlsson
Nathaniel Frucht
ATTORNEY Patented Aug. 14, 1934

1,970,534

UNITED STATES PATENT OFFICE 1,970,534

METHOD OF HEAT EXCHANGE

Haldwell S. Colby and Per Hilmer Karlsson, Wellsville, N. Y., assignors to Air Preheater Corporation, a corporation of New York Original application January 2, 1930, Serial No. 418,029. Divided and this application July 30, 1932, Serial No. 626,772

8 Claims. (Cl. 257—6)

This application is a division of application Serial No. 418,029, filed January 2, 1930, for Heat exchange installations.

Our present invention relates to the operation of heat exchanging installations, and has particular reference to heat exchange systems for hot gases containing excessive amounts of solid impurities.

One object of the invention is to provide a novel method of utilizing a heat exchanger and gas purifier for purifying impurity laden gases of this character while conserving their heat content.

Another object is to improve the operation of a heat exchanger by utilizing novel scavenging means.

These and other objects and advantageous features will be readily apparent from the detailed description following, in conjunction with the accompanying drawings, and will be particularly pointed out in the appended claims.

In the drawings:

Fig. 3 is a horizontal section through the upper portion of the heat exchanger, showing the scavenging and sealing air passages; and Fig. 4 is a detail vertical section on the line 4—4 of Figure 3.

Figure 1:
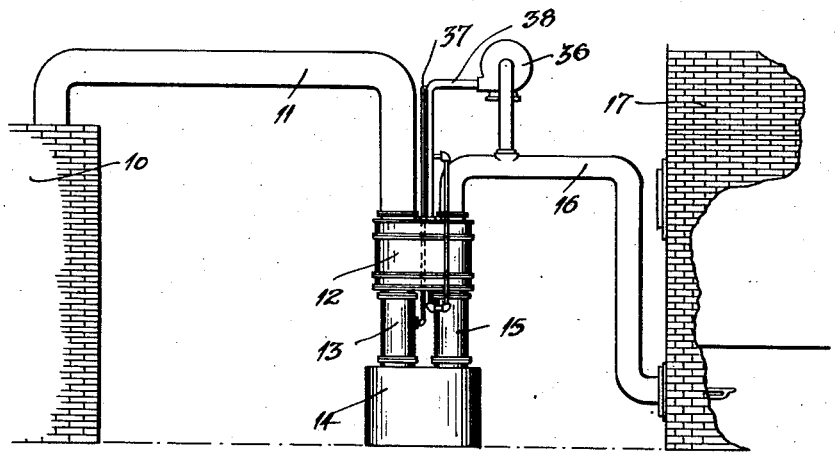
Fig. 1 is a diagrammatic view of a specific form of installation suitable for use with blast furnace gases.

The utilization of blast furnace gases for steam generation involves the problem of removing dust and other solid impurities from the hot gases. These hot gases contain a tremendous quantity of fine dust which is carried in suspension, and have required washing before passage to the boilers in order to prevent deposit of dust and clogging of the pipe lines, gas furnace, and boiler units. The washing process reduces the amount of dust to a small quantity, in the neighborhood of 1% of the original amount, but the washed gases retain moisture which is afterwards liberated during combustion of the gases in the boiler, this moisture being sufficient to produce clogging of the pipe lines between the washer and the point of consumption as well as in the burner equipment of boilers under which the gases are burned, by depositing sludge therein.

We have found that passing the washed gas through a preheater raises the temperature sufficiently so that the gas will carry all the water, in vapor form, the temperature obtained being sufficiently high to prevent precipitation or liberation of moisture in the ducts or conduits and in the burner equipment; and we have devised a novel operating procedure for a heat exchanger and gas washer to minimize the sludge deposit, the hot gases being passed through an air preheater to reduce their temperature, then to the washer, and then back into the air preheater to reabsorb the heat initially transferred. We have also a novel scavenging operation to eliminate transfer of dust or dirty gases to the washed gases passing to the boiler; and the following is a detailed description of one specific arrangement to which the novel principles of our invention may be applied.

Referring to the drawings, hot gases from the blast furnace 10 pass through the conduit 11 into the hot gas side of a preheater 12, preferably of the rotary regenerative type. The cooled gases then pass through the conduit 13 into a gas washer 14 of any well-known type, and the washed purified gases are returned into the heat exchanger 12 through a conduit 15, and are then led through conduit 16 to the boiler plant 17.

Figure 2:
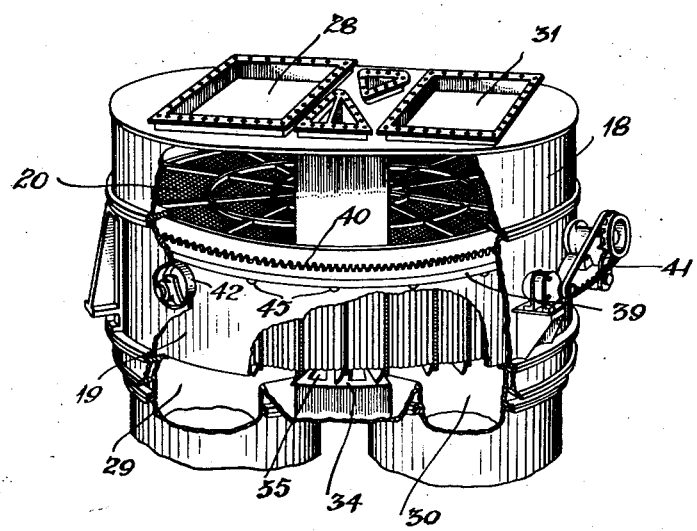
Fig. 2 is a perspective view, partly broken away, of the improved heat exchanger.

The heat exchanger is shown in detail in Figures 2, 3, and 4, and includes an outer casing 18, and a rotor 19 rotatably mounted therein and divided into radial sectors 20 each containing regenerative material 21. The casing is divided into a hot gas section and a washed gas section by a transverse partition 22, and two radial partitions 23, 24, the said partitions defining two radial sectors corresponding in size to the sectors 20 of the rotor 19. The sector between the partitions 22 and 24 is sub-divided by an additional partition 25 into a scavenging sector 26 and a gas sealing sector 27.

A hot gas inlet 28 and outlet 29 permit the hot gases to traverse the hot gas section of the preheater as the regenerative material in the rotor sectors 20 passes to absorb and store heat therefrom, and a washed gas inlet 30 and outlet 31 permit the washed gases to pass through the heated regenerative material to extract the stored heat.

The partitions 32 separating the sectors 20 have sealing strips 33 at both the upper and the lower ends thereof, contacting with a closure member 34 which is in alignment with and of the same size as the sector between partitions 22 and 24. The lower sector member 34 has a port 35 therein leading to the atmosphere or to a low pressure chamber and of a size corresponding to the width of sector 26, the sealing strips 33 of the rotor partitions 32 separating the scavenging and sealing sectors and the hot gas section from the washed gas section during the rotation of the rotor.

A gas blower 36 of the multiple stage type supplies compressed washed gas at high pressure to sector 26 through pipe line 37 and compressed washed gas at a lower pressure to sector 27 through pipe line 38, the pressure of the gas supplied to sector 27 being greater than the pressure of the hot gases which pass through the hot gas portion of the heat exchanger. As shown in Figs. 1 and 4, the lower pressure washed gas is supplied to the sealing sector on both sides thereof, in order to maintain the sealing pressure. Such leakage as occurs is to the washed gas passageway, thus conserving the washed gas. The high pressure washed gas preferably passed out through the port 35 to the conduit 13 to join the hot gases for washing and cleaning in the gas washer 14.

The rotor 19 has an annular flange 39 on which an annular gear 40 is mounted, in operative engagement with a pinion (not shown) rotated through operating mechanism 41. The flange 39 is supported on a plurality of spaced rollers 42 suitably mounted in the casing 18, and carries spaced projections 45, preferably formed by bolt heads or the like inserted in the flange, which projections ride on the rollers 42 and thus cause a jarring or a jolting of the rotor to dislodge collected dust.

The hot gases from a blast furnace or furnaces have a temperature in the neighborhood of 300 degrees Fahrenheit; this temperature is reduced in passing through the heat exchanger to about 200 degrees F., the washer causing a further temperature drop to about 65 degrees F.; the lower temperature of the gases entering the washer thus reduces the work of the washer and decreases the percentage of absorbed moisture. The washed gases now pass through the heat exchanger, with a resulting temperature increase to about 150 degrees F., thus conserving a large part of the gas heat and at the same time reducing the moisture content. As the rotor turns, the high pressure scavenging washed gas blows through the regenerative material, removing the dust and dust-laden hot gases therefrom, the constant jarring of the rotor preventing the formation of hard deposits; in addition, the maintenance of a higher pressure between partitions 22 and 24 and above the separating sector member 34 prevents leakage of hot gases across into the washed gas section. If desirable or necessary, a similar higher pressure arrangement may be provided for the separating sector between partitions 22 and 23.

While we have described a preferred method of the utilization of our invention, desired changes in operating procedure may be made to meet the needs of particular installations, within the scope of the invention as defined in the appended claims.

We claim:—

1. In a process for purifying hot gases containing solid impurities, the steps of transferring heat from the hot gases to a regenerative mass to lower the gas temperature, washing the cooled gases, retransferring the heat from said regenerative mass to the washed cooled gases to reheat the same, and scavenging said regenerative mass after the retransfer of heat.

2. In a method of heat exchange, the steps of conducting hot and cold fluids through heat exchange apparatus in adjacent streams, and maintaining a fluid pressure between said streams at least equal to the pressure of the hot fluid.

3. In a method of heat exchange, the steps of conducting hot and cold fluids through regenerative material in adjacent streams, and maintaining a fluid pressure between said streams at least equal to the pressure of the hot fluid.

4. In a method of heat exchange, the steps of conducting hot and cold fluids through heat exchange apparatus in adjacent streams, said hot fluids containing impurities and said cold fluids being relatively clean, and interposing a curtain of clean fluid between said hot and cold fluids to prevent admixture thereof.

5. In a method of heat exchange, the steps of conducting hot and cold fluids through regenerative material in adjacent streams, said hot fluids containing impurities and said cold fluids being relatively clean, and interposing a curtain of clean fluid between said hot and cold fluids to prevent admixture thereof.

6. In a method of heat exchange, the steps of passing hot fluid through a heat exchanger to cool the same, cleaning said cooled fluid, passing the cleaned cooled fluid through the heat exchanger to heat the same, said hot fluid and said cleaned cooled fluid passing through said regenerative material simultaneously, and utilizing part of the cleaned cooled fluid under pressure as a fluid curtain to prevent admixture of said hot fluid and said cleaned cooled fluid during their flow through the heat exchanger.

7. In a method of heat exchange, the steps of passing hot fluid through regenerative material to cool the same, cleaning said cooled fluid, passing the cleaned cooled fluid through the regenerative material to heat the same, said hot fluid and said cleaned cooled fluid passing through said regenerative material simultaneously, and utilizing part of the cleaned cooled fluid under pressure as a fluid curtain to prevent admixture of said hot fluid and said cleaned cooled fluid during their flow through the regenerative material.

8. In a method of heat exchange, the steps of passing hot fluid through regenerative material to cool the fluid, cleaning the cooled fluid, scavenging the regenerative material, and passing the cleaned cooled fluid back through the regenerative material to reheat the fluid, said scavenging being prior to the passing of the cleaned cooled fluid back through the regenerative material.

HALDWELL S. COLBY.
P. HILMER KARLSSON.